(12) United States Patent
Sekiba et al.

(10) Patent No.: US 7,115,236 B2
(45) Date of Patent: Oct. 3, 2006

(54) EXHAUST GAS PURIFYING METHOD AND SYSTEM FOR FUEL CELL VEHICLE

(75) Inventors: Toru Sekiba, Yokohama (JP); Hiroshi Akama, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 349 days.

(21) Appl. No.: 10/467,926

(22) PCT Filed: Dec. 25, 2002

(86) PCT No.: PCT/JP02/13511

§ 371 (c)(1),
(2), (4) Date: Aug. 13, 2003

(87) PCT Pub. No.: WO03/056650

PCT Pub. Date: Jul. 10, 2003

(65) Prior Publication Data

US 2004/0072687 A1    Apr. 15, 2004

(30) Foreign Application Priority Data

Dec. 27, 2001  (JP) .............................. 2001-397216

(51) Int. Cl.
*B01D 53/72* (2006.01)
*B01D 53/62* (2006.01)
*B01D 53/46* (2006.01)

(52) U.S. Cl. .................. 423/210; 423/245.1; 423/247; 423/248; 423/418.2; 423/437.2; 423/650; 423/651; 252/373

(58) Field of Classification Search ................ 423/210, 423/245.1, 247, 248, 418.2, 437.2, 650, 651; 252/373
See application file for complete search history.

(56) References Cited

U.S. PATENT DOCUMENTS

| | | | |
|---|---|---|---|
| 6,010,675 A | | 1/2000 | Trocciola et al. |
| 6,165,633 A | * | 12/2000 | Negishi ....................... 429/17 |
| 6,702,960 B1 | | 3/2004 | Schaddenhorst et al. |
| 2004/0047788 A1 | * | 3/2004 | Abe ........................... 423/247 |
| 2004/0137288 A1 | * | 7/2004 | Morgenstern ................ 429/17 |
| 2004/0166386 A1 | * | 8/2004 | Herman et al. ............... 429/22 |
| 2005/0129995 A1 | * | 6/2005 | Kato et al. ................... 429/17 |

FOREIGN PATENT DOCUMENTS

| | | |
|---|---|---|
| EP | 0 978 314 A1 | 2/2000 |
| EP | 1 036 757 A1 | 9/2000 |
| EP | 1 174 486 A1 | 1/2002 |
| FR | 2 795 339 A1 | 12/2000 |
| JP | 2000-000466 A | 1/2000 |
| JP | 2002-519181 A | 7/2002 |
| WO | WO 00/00425 A1 | 1/2000 |
| WO | WO 2004/108256 A1 * | 12/2004 |

OTHER PUBLICATIONS

Y. Hanaki et al., "Research on Exhaust Emission Control Characteristics of Natural Gas Vehicles", Collected Papers of Society of Automotive Engineers of Japan, Inc., vol. 27, No. 2, Apr. 1996, pp. 51-56.

* cited by examiner

*Primary Examiner*—Stanley S. Silverman
*Assistant Examiner*—Timothy C. Vanoy
(74) *Attorney, Agent, or Firm*—Foley & Lardner LLP (57) ABSTRACT

An exhaust gas purifying method for a fuel cell vehicle comprises preparing an exhaust gas purifying system for the fuel cell vehicle, the exhaust gas purifying system including a methane removal catalyst for accelerating the conversion of methane into hydrogen and carbon monoxide. The methane removal catalyst comprises a catalytic ingredient including at least one of rhodium, platinum and palladium.

2 Claims, 4 Drawing Sheets

EXHAUST GAS PURIFYING METHOD AND SYSTEM FOR FUEL CELL VEHICLE

TECHNICAL FIELD

The present invention relates to a method and a system for purifying exhaust gas of a fuel cell vehicle. More specifically, the present invention relates to a method and a system for purifying exhaust gas, in which methane contained in exhaust gas from a fuel cell stack is removed under low temperature conditions.

BACKGROUND ART

In recent years, it has been desired that a fuel cell vehicle (FCV) be put into practical use as early as possible, since environmental problems and energy problems are increasingly attracting attention on a global scale. In this fuel cell vehicle, hydrogen and oxygen react with each other to generate electric energy and emit carbon dioxide ($CO_2$) and water ($H_2O$). Besides $CO_2$ and $H_2O$, hydrogen ($H_2$) and methane ($CH_4$) are emitted from a fuel cell stack and the like of the fuel cell vehicle using gasoline as a fuel. Of these, $H_2$ is burned relatively easily even at low temperatures if a catalyst is used and can be emitted as $H_2O$. Meanwhile, $CH_4$ is one of the typical greenhouse effect gases in addition to $CO_2$. One molecule of $CH_4$ brings a global warming effect equivalent to that of approximately twenty molecules of $CO_2$. Hence, it is necessary to control the emission of $CH_4$ to the atmosphere as much as possible.

As a technology for removing $CH_4$ from the exhaust gas, a catalytic combustion method has been known, in which $CH_4$ is burned and removed by use of a catalyst under so-called lean conditions where oxygen is excessive.

Moreover, method for improving a catalyst is conceived in order to reduce $CH_4$ in the exhaust gas. A catalyst for removing $CH_4$ from the exhaust gas has been researched regarding the purification of the exhaust gas of a compressed natural gas (CNG) vehicle. Concretely, application of a three-way catalyst has been examined, and a technology for removing $CH_4$ efficiently even under relatively low temperature conditions of approximately 400° C. has been disclosed ("Hanaki, Sekiba, Ishii, Okada and Ishizawa; Collected Papers of Society of Automotive Engineers of Japan, Inc., Vol. 27, No. 2, April, 1996 (9634549)"). This method is for controlling an air/fuel ratio of the exhaust gas at around a stoichiometric condition by use of a noble metal catalyst, and is conceived to be effective for purifying exhaust gas of an internal combustion engine, which contains a relatively little moisture.

DISCLOSURE OF THE INVENTION

However, burning and removing a predetermined amount of $CH_4$ (for example, at a removal efficiency of 90% or higher) by use of the catalytic combustion method usually requires a high temperature equal to/higher than 600° C. In order to realize such a high temperature as described above in the fuel cell vehicle, it is necessary to make full use of a heat exchanger and the like. In the case of providing the heat exchanger and the like, a system for purifying exhaust gas will be complicated and the efficiency of the fuel cell vehicle will be lowered as a natural conclusion, and the fuel cell vehicle will become less competitive in terms of fuel consumption and cost.

Moreover, in the case of using the three-way catalyst, the $CH_4$ removal performance of the catalyst is significantly inhibited by coexisting moisture, and therefore, it is assumed that it is difficult to apply the three-way catalyst directly to the exhaust gas from the fuel cell stack, which contains an extremely large amount of moisture. Moreover, it has not been found into which component $CH_4$ would be converted by a method using the three-way catalyst. Therefore, applicability to the fuel cell vehicle is unknown.

In consideration of the foregoing facts, it is an object of the present invention to provide a method for removing methane contained in the exhaust gas of the fuel cell vehicle efficiently even in a low temperature range. It is another object of the present invention to provide an exhaust gas purifying system for the fuel cell vehicle, in which methane contained in the exhaust gas from the fuel cell stack containing an extremely large amount of moisture is removed efficiently in a low temperature range.

According to one aspect of the present invention, there is provided an exhaust gas purifying method for a fuel cell vehicle, comprising: preparing an exhaust gas purifying system for the fuel cell vehicle, the exhaust gas purifying system including a methane removal catalyst for accelerating conversion of methane into hydrogen and carbon monoxide, the methane removal catalyst, comprising: a first catalytic ingredient including at least one of rhodium, platinum and palladium, wherein an oxygen excessive rate $\zeta$ of exhaust gas introduced to a region where the methane removal catalyst is disposed is set in a range from 50% to 98%, the oxygen excessive rate $\zeta$ being defined by a following formula (1):

$$\zeta = \frac{C_{O2}}{C_{CH4} \times 2 + C_{H2} \times 0.5} \times 100 \quad (1)$$

where $C_{O2}$ is a concentration of oxygen, $C_{CH4}$ is a concentration of methane, and $C_{H2}$ is a concentration of hydrogen.

According to another aspect of the present invention, there is provided an exhaust gas purifying system for a fuel cell vehicle, comprising: a methane removal catalyst comprising a first catalytic ingredient including at least one of rhodium, platinum and palladium.

BEST MODE FOR CARRYING OUT THE INVENTION

To describe the present invention in more detail, preferred embodiments of the present invention will be explained with reference to the drawings below.

While an exhaust gas purifying system of the present invention is for purifying an exhaust gas of a fuel cell stack, no particular limitations are imposed on a fuel cell to be applied thereto. Specifically, the exhaust gas purifying system of the present invention can be applied to fuel cell vehicles equipped with various fuel cells such as a polymer electrolyte fuel cell (PEFC) and a solid oxide fuel cell (SOFC) as long as methane ($CH_4$) exists in the exhaust gas. It can be said that the polymer electrolyte fuel cell is preferable among the various fuel cells, considering that the polymer electrolyte fuel cell can be activated at a normal temperature, miniaturized and reduced in weight. The exhaust gas purifying system of the present invention can be applied not only to the fuel cell vehicle in a pure meaning, which is equipped only with the fuel cell as power source, but also to a hybrid vehicle combining the fuel cell with a lithium cell or combining the fuel cell with an internal combustion engine. Hence, the "fuel cell vehicle" in the present invention includes both types of vehicles.

No particular limitations are imposed on the configuration of the fuel cell stack. The exhaust gas of the fuel cell stack usually contains slight amounts of methane ($CH_4$), hydrogen ($H_2$) and oxygen ($O_2$) in addition to nitrogen ($N_2$), carbon dioxide ($CO_2$) and water ($H_2O$) in the case of using air as an oxidizer for the fuel cell. The exhaust gas purifying system of the present invention is characterized by comprising a methane removal catalyst for purifying the exhaust gas of the fuel cell. For catalytic ingredients in the methane removal catalyst, platinum (Pt), rhodium (Rh) and palladium (Pd) are used. Two or three of these ingredients may be used in combination. Since these metals are effective for activating methane, the methane removal catalyst can remove methane in the exhaust gas to an extremely low concentration even at the low temperature. Note that palladium is preferable among platinum, rhodium and palladium to be used as the methane removal catalyst for the reason that palladium is excellent in low-temperature oxidation activity. In the case of using a catalytic combustion method for burning and removing methane by use of a catalyst under the conditions where oxygen is excessive, which has heretofore been used for removing methane in the exhaust gas, it is necessary to forcibly increase an amount of oxygen by providing an oxygen supplying device in order to obtain the conditions where oxygen is excessive. Furthermore, it is difficult to remove methane to a low concentration unless the methane removal catalyst is heated up to no less than 600° C. Regarding this point, in the case of using the exhaust gas purifying system of the present invention, it is possible to remove methane extremely efficiently even at a low temperature of, for example, 400° C. because a methane activation function of the noble metals is further enhanced by controlling an oxygen excessive rate of the exhaust gas in a certain range. Accordingly, it is possible to simplify and to lower manufacturing cost of the exhaust gas purifying system in comparison with the conventional one in which the methane removal catalyst has been required to be heated to high temperatures. Moreover, it is possible to reduce the weight of the exhaust gas purifying system and to improve the fuel consumption of the fuel cell vehicle having the exhaust gas purifying system of the present invention mounted thereon.

The "methane removal catalyst" in the present invention implies a catalyst used for removing methane contained in the exhaust gas from the fuel cell stack, and the form thereof is not particularly limited. The catalytic ingredient such as palladium may be directly supported on a region of the fuel cell stack, where the exhaust gas flows. However, it is preferable that the catalytic ingredient is supported on the region of the fuel cell stack, where the exhaust gas flows, in a state of being loaded on a carrier, considering the improvements of the performance, durability and the like of the catalyst. Various carriers can be used, which include alumina ($Al_2O_3$), silica ($SiO_2$), zirconia ($ZrO_2$), titania ($TiO_2$), magnesia (MgO) and ceria ($CeO_2$). Among them, alumina is preferable. In this case, the above-described carriers may be used singly, or two or more types thereof may be combined for use. Alumina can be appropriately selected from various types of crystal states such as $\gamma$-$Al_2O_3$, $\eta$-$Al_2O_3$ and the like. If the amount of catalytic ingredient loaded on the carrier is too small, the catalytic function thereof is weakened, such that the catalyst might not be able to remove methane sufficiently. Therefore, it is preferable that the content concentration of the catalytic ingredient is 1 wt % or more with respect to the mass of the carrier in a state where adsorbed water is removed therefrom. On the other hand, if the amount of catalytic ingredient loaded on the carrier is too large, then the particle diameter of the catalytic ingredient becomes enormous, and the amount of the catalytic ingredient exposed on the surface where the exhaust gas flows may possibly be reduced relatively. Specifically, the specific surface area of the catalytic ingredient may possibly be reduced. Furthermore, the interaction with the carrier might possibly be weakened, and activity per one active site might be lowered. Therefore, it is preferable that the content concentration of the catalytic ingredient is 10 wt % or less with respect to the mass of the carrier where the adsorbed water is removed therefrom. Note that the content concentration of the catalytic ingredient with respect to the mass of the carrier where the adsorbed water is removed therefrom can be measured by publicly known methods such as ICP (inductively coupled plasma emission spectrophotometric analysis), fluorescent X-ray analysis and atomic absorption analysis. For example, in the case of using the ICP method, a sample is dried for four hours or more at a temperature of approximately 120° C. in a dryer to remove moisture therefrom. Next, the catalytic ingredient is analyzed by the ICP method.

The methane removal catalyst may also contain zeolite as another component. Steam in the gas can be adsorbed by zeolite by allowing the methane removal catalyst to contain zeolite. Therefore, an adverse effect caused by the steam on the catalytic ingredient can be alleviated, thus making it possible to accelerate a removal reaction of methane. Cited as zeolite are: MFI-type zeolite, mordenite, beta zeolite, FAU (faujasite)-type zeolite, FER (ferrierite)-type zeolite, ERI (erionite)-type zeolite, LTL (L-type)-type zeolite, and CHA (chabazite)-type zeolite. Furthermore, zeolite may be provided with a function as the carrier of the catalytic ingredient. Although the amount of zeolite in the methane removal catalyst is not particularly limited, the amount of zeolite is generally in a range of 5 wt % to 15 wt % of the total amount of the catalytic ingredient and the carrier.

A variety of publicly known methods for manufacturing the methane removal catalyst can be used, and no particular limitations are imposed thereon. Examples of cited methods include; a method, in which slurry containing a compound selected from the platinum group compound such as palladium nitrate, palladium chloride, rhodium nitrate, rhodium chloride, platinum nitrate and platinum chloride, is prepared, and the prepared slurry is sprayed on the carrier and then dried; a method in which the carrier is impregnated with an aqueous solution containing the platinum group compound and then dried, and the like. The amount of palladium loaded on the carrier can be adjusted by controlling the concentration of palladium in the solution to be used. In order to allow the methane removal catalyst to contain zeolite, it is satisfactory if an adequate amount of zeolite is mixed into the solution containing the platinum group compound.

The methane removal catalyst may sometimes contain alkaline metal and alkaline earth metal depending on the case. For example, the three-way catalyst for purifying the exhaust gas from an internal combustion engine is sometimes allowed to contain the alkaline metal such as potassium (K) and the alkaline earth metal such as barium (Ba) and magnesium (Mg) in anticipation of an effect such as the enlargement of an air/fuel ratio window, an improvement of the heat resistance and the like. However, these components lower the catalytic performance in the methane removal catalyst for use in the exhaust gas purifying system of the present invention. It is assumed that this is because the interaction between methane and palladium, which is generally conceived to be weak, is further weakened if palladium coexists with the alkaline metal and the alkaline earth metal. Accordingly, it is preferable that the content of the alkaline metal and the alkaline earth metal be set at 3 wt % or less with respect to the mass of the methane removal catalyst.

Figure 4A:
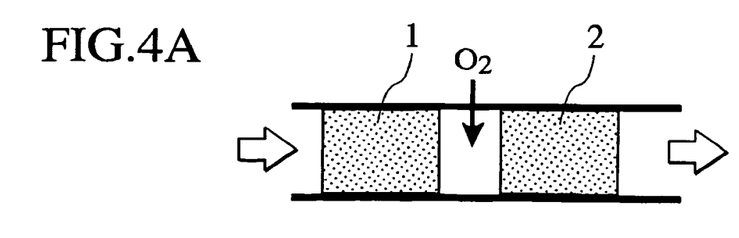
FIG. 4A is a schematic view of a two-stage exhaust gas purifying system.
Figure 4B:
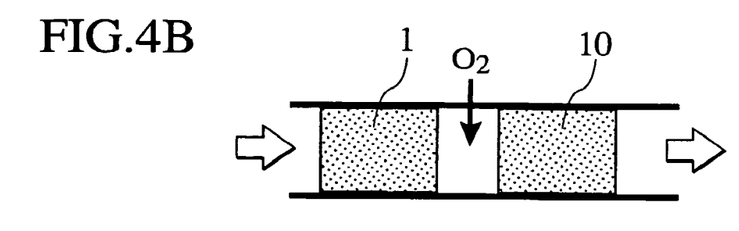
FIG. 4B is a schematic view of a two-stage exhaust gas purifying system.

Preferably, the exhaust gas purifying system of the present invention is made as a two-stage exhaust gas purifying system in which a hydrogen and carbon monoxide removal catalyst is further provided downstream of the methane removal catalyst with regard to the flow of the exhaust gas from the fuel cell stack (refer to FIGS. 4A and 4B). The two-stage catalyst system is adopted to control the concentration of oxygen at the inlet of the catalyst, thus making it possible to convert methane into carbon dioxide and water extremely effectively. Based on the analysis of the gaseous components at the outlet of the catalyst, it is suggested that the reaction for once converting methane into hydrogen and carbon monoxide by controlling the concentration of oxygen is a reaction represented in the following formula (2). In the two-stage catalyst system, hydrogen and carbon monoxide, which have been generated by the reaction represented by the formula (2), are removed by reactions represented in the following formulas (3) and (4) by means of the hydrogen and carbon monoxide removal catalyst.

$$CH_4 + 1/2O_2 \rightarrow CO + 2H_2 \qquad (2)$$

$$CO + 1/2O_2 \rightarrow CO_2 \qquad (3)$$

$$2H_2 + O_2 \rightarrow 2H_2O \qquad (4)$$

In the case of adopting the two-stage exhaust gas purifying system, the concentration of oxygen needs to be controlled to be optimum for each catalyst. Specifically, the methane removal catalyst at the first stage (upstream side) is set at "rich condition", where the concentration of oxygen is controlled and a oxygen excessive rate is in the range of 50% to 98%, in order to progress the methane removal at a low temperature efficiently. Then, in the hydrogen and carbon monoxide removal catalyst at the second stage (downstream), the concentration of oxygen is set at "lean condition", where the concentration of oxygen is increased, in order to progress the reactions represented in the above formulae (3) and (4) efficiently. Only with the methane removal catalyst, it is possible to remove a considerably large amount of hydrogen. However, it is possible to further reduce the residual hydrogen and the CO emission by adopting the two-stage exhaust gas purifying system further provided with the hydrogen and carbon monoxide removal catalyst. As a concrete form thereof, a form is cited, in which oxygen is supplied between the region of the first-stage catalyst including the methane removal catalyst and the region of the second stage catalyst including the hydrogen and carbon monoxide removal catalyst, and thus hydrogen and CO removal is accelerated.

The "hydrogen and carbon monoxide removal catalyst" in the present invention indicates a catalyst to be used for removing hydrogen and carbon monoxide contained in the exhaust gas passed through the methane removal catalyst. For the catalytic ingredient, platinum (Pt), rhodium (Rh) and palladium (Pd) can be used. These components may be used singly, or two or more components may be combined for use. Among them, platinum, which is excellent in complete oxidation activity, is preferable. This is because platinum is very effective in lowering the concentrations of residual hydrogen and carbon monoxide, since platinum is excellent in complete oxidation activity. The form of catalyst is not particularly limited, and the catalytic ingredient such as palladium may be directly supported on the portion of the fuel cell stack, where the exhaust gas flows. However, it is preferable that the catalytic ingredient be supported on the region of the fuel cell stack, where the exhaust gas flows, in a state of being loaded on the carrier, considering the improvements of the performance, durability and the like of the catalyst. Various carriers can be used, which include alumina ($Al_2O_3$), silica ($SiO_2$), zirconia ($ZrO_2$), titania ($TiO_2$), magnesia (MgO) and ceria ($CeO_2$). Alumina can be appropriately selected from various types of crystal states such as $\gamma$-$Al_2O_3$, $\eta$-$Al_2O_3$ and the like. In this case, the above-described carrier may be used singly, or two or more types thereof may be combined for use.

If the amount of the catalytic ingredient loaded on the carrier is too small, then the catalytic function by the catalytic ingredient is weakened, that the catalyst might not be able to remove hydrogen and carbon monoxide sufficiently. Therefore, it is preferable that the content of the loaded catalytic ingredient be 0.1 wt % or more with respect to the mass of the carrier in a state where adsorbed water is removed therefrom. On the other hand, if the amount of the catalytic ingredient loaded on the carrier is too large, then a methane conversion reaction represented in the following formula (5) may possibly progress, thus causing the lowering of the methane purifying power of the exhaust gas purifying system:

$$CO + 3H_2 \rightarrow CH_4 + H_2O \qquad (5)$$

Therefore, it is preferable that the content of the loaded catalytic ingredient is 3 wt % or less with respect to the mass of the carrier in a state where adsorbed water is removed therefrom. Note that the content of the catalytic ingredient with respect to the mass of the carrier where adsorbed water is removed therefrom can be measured by publicly known methods such as ICP (inductively coupled plasma emission spectrophotometric analysis), fluorescent X-ray analysis and atomic absorption analysis similarly to the above.

The form and manufacturing conditions of the hydrogen and carbon monoxide removal catalyst are similar to those of the above-described methane removal catalyst, and description thereof will be omitted. Although it is possible to make the catalytic ingredient of the methane removal catalyst and the catalytic ingredient of the hydrogen and carbon monoxide removal catalyst in the same way, the "methane removal catalyst" indicates a catalyst to be dedicatedly used for removing methane for the convenience of distinction in this application. For example, in the case of forming the two-stage exhaust gas purifying system as shown in FIG. 4A, the "methane removal catalyst" indicates the catalyst at the first stage, which is to be dedicatedly used for removing methane, even in the case where the catalyst at the second stage contains palladium as the catalytic ingredient similar to the one in the first stage. However, it is not intended to indicate that the catalytic ingredient in the second stage does not have methane removal performance at all, or that the catalytic ingredient in the first stage does not have hydrogen and carbon monoxide removal performance at all, either.

For supporting the methane removal catalyst and the hydrogen and carbon monoxide removal catalyst on the region of the fuel cell stack, where the exhaust gas flows, publicly known technologies can be used. For example, slurry containing these catalysts is prepared, and the prepared slurry is coated and dried on the region of the fuel cell stack, where the exhaust gas flows, and thus the catalysts can be supported. It is preferable that each of the methane removal catalyst and the hydrogen and carbon monoxide removal catalyst is coated and dried on a monolithic honeycomb support to form a monolithic honeycomb catalyst. In the case of adopting a configuration in which the exhaust gas purifying system includes only the methane removal catalyst, naturally, it is preferable that only the methane removal catalyst is supported on the monolithic honeycomb support. In the case of supporting the catalyst on a pellet catalyst or the like, possibly, the catalyst may be abraded due to vibrations of a vehicle while being driven, and powder thereof may be emitted from an exhaust pipe. However, in the case of supporting the catalyst on the monolithic honeycomb support and using the same, a problem as described above can be limited. Moreover, the catalyst can be made relatively compact since pressure loss is low. No particular limitations are imposed on the monolithic support, and monolithic supports made of various materials such as metal and ceramics can be used. Commercially available supports may be applied.

Although the monolithic honeycomb catalyst can be manufactured by coating the catalytic ingredient on the monolithic honeycomb support, the catalytic performance thereof cannot be exerted sufficiently in some cases depending on the shape of openings thereof. Usually, a monolithic honeycomb support is used, in which the shape of openings is square, triangular, hexagonal or the like. If the shape of openings is polygonal as described above, then the catalytic ingredient coating is concentrated on corner (vertex) portions, and a thickness of coated layers in the vicinity of the corners is increased. Therefore, it is possible that the catalytic ingredient cannot be applied effectively. In order to solve such a problem, preferably, the shape of openings is formed to be circular or elliptical by coating a refractory inorganic compound such as alumina on the openings of the monolithic honeycomb support, thus ensuring an even coating. Specifically, it is preferable that the monolithic honeycomb catalyst is configured such that the shape of openings is formed to be circular or elliptical by the refractory inorganic compound and that the catalytic ingredient is supported on the surfaces of the openings formed to be circular or elliptical.

Preferably, the coating amount of the refractory inorganic compound is 50 g/L or more and 100 g/L or less. With the amount to such an extent, the openings can be made approximately circular or elliptical, and the increase of pressure loss due to an excessive coating can be prevented. The coated layer made of the refractory inorganic compound can be formed by preparing, coating, drying and baking slurry containing the refractory inorganic compound.

The supported amounts of the methane removal catalyst and the hydrogen and carbon monoxide removal catalyst are numerical values determined by the vehicle being used and the type and size of the fuel cell, and cannot be defined uniquely. However, an amount ranging from 2 to 10 g/L is general in terms of an amount of catalyst metal.

The regions where the fuel cell stack and the catalyst are provided may be determined in accordance with the spaces of the vehicle, where the fuel cell stack and the catalyst are mounted, and the fuel cell stack and the catalyst may be connected to each other by piping and the like. Moreover, an oxygen supplier can be provided in order to control an oxygen excessive rate defined in the formula (1). The region where oxygen is supplied may be provided between regions where the fuel cell stack and the methane removal catalyst are provided, and according to needs, between regions where the methane removal catalyst and the hydrogen and carbon monoxide removal catalyst are provided. The oxygen excessive rate can be controlled by supplying oxygen gas using the oxygen supplier. Moreover, various techniques are conceived for controlling a supplied amount, such as a control by a detector of the oxygen excessive rate and a movable valve controller.

Subsequently, an exhaust gas purifying method for the fuel cell vehicle will be described, which uses the foregoing exhaust gas purifying system for the fuel cell vehicle.

For removing methane efficiently in a low temperature range, it is important to appropriately control the oxygen excessive rate $\zeta$ defined by the following formula (1) with regard to the exhaust gas of the fuel cell stack, which is introduced to the portion where the methane removal catalyst is provided.

$$\zeta = \frac{C_{O2}}{C_{CH4} \times 2 + C_{H2} \times 0.5} \times 100 \qquad (1)$$

Here in the formula, $C_{O2}$ is a concentration of oxygen, $C_{CH4}$ is a concentration of methane, and $C_{H2}$ is a concentration of hydrogen. Concretely, it is preferable that the oxygen excessive rate is controlled in a range from 50% to 98%. If the oxygen excessive rate is outside this range, then the methane removal performance in a low temperature range (for example, at 400° C.) is lowered. This oxygen excessive rate is significantly lower than in the case of removing methane by use of the catalytic combustion method. Accordingly, it is possible to reduce cost and space, which are required for an extra device for increasing the oxygen excessive rate.

As the reason that excellent methane removal performance is obtained in the case of setting the oxygen content at a relatively low concentration as described above, it is conceived that the following mechanism operates. The foregoing reaction (2) is conceived to occur easily originally even under the oxygen excessive conditions. However, methane is difficult to adsorb on the surface of the catalyst, and $O_2$ exclusively adsorbs on and coats the surface of the catalyst. Specifically, the adsorbing and poisoning effect of $O_2$ is conceived to inhibit the reaction (2). In this connection, the present invention controls the concentration of $O_2$ to be relatively low, thus achieving the limitation of the poisoning effect originated from $O_2$ and the acceleration of the partial oxidation reaction (2). Such a fact is conceived to be the reason that the purification performance is insufficient where the oxygen excessive rate $\zeta$ is 100%, which is so-called stoichiometry, and is effective where the oxygen excessive rate $\zeta$ is 98% or less, which is so-called rich conditions. Meanwhile, in the above reaction (2), one-half oxygen for methane amount is necessary for the methane removal reaction. If the oxygen excessive rate is 50% or less, sufficient removal performance can be expected.

As shown in FIG. 4A, when the exhaust gas purifying system further includes the hydrogen and carbon monoxide removal catalyst provided downstream of the methane removal catalyst, it is preferable to control the oxygen excessive rate of gas introduced to the hydrogen and carbon monoxide removal catalyst at 100% or more. When it is desired that hydrogen be removed more completely, it is preferable to set the oxygen excessive rate at 120% or more. The exhaust gas is treated under such a high oxygen concentration as described above, and thus the amount of hydrogen remaining in the gas flowing through the exhaust gas purifying system can be reduced to an extremely low concentration. Although the upper limit of the oxygen excessive rate of the gas introduced to the hydrogen and carbon monoxide removal catalyst is not particularly limited, it is practical that the oxygen excessive rate is 300% or less, considering the labor taken for increasing the oxygen excessive rate and the change of the hydrogen removal performance. Note that the oxygen excessive rate can be calculated by means of a gas chromatography and the like. When the exhaust gas purifying system is applied to a vehicle, the oxygen excessive rate can be calculated by means of an A/F sensor.

In order to achieve more efficient removal of methane by means of the exhaust gas purifying system, it is preferable to control the temperature of the exhaust gas of the fuel cell stack, which is introduced to the region where the methane removal catalyst is provided, in a range from 200° C. to 600° C. In the case of driving the system in such a manner, not only more efficient removal of methane can be achieved, but also the manufacturing cost of the device can be reduced. To be specific, it is necessary to increase the exhaust gas temperature by use of the heat exchanger when the temperature of the introduced exhaust gas is low. However, the degree of freedom in selecting the performance of the heat exchanger and a heat-resistant material is increased if the exhaust gas temperature to be increased is small. Therefore, the optimum material can be selected from various materials, considering the cost and the durability.

Although the present invention will be described below in more detail based on examples and comparative examples, the present invention is not limited to these examples.

<1. Catalysts for Use in Experiments>

First, description will be made for monolithic honeycomb catalysts 1 to 24 that were used for verifying the effects of the present invention.

CATALYST EXAMPLE 1

Active alumina (γ-alumina) having a specific surface area of 240 m²/g was impregnated with a palladium nitrate aqueous solution in which a concentration of palladium is 2.5 wt %, and was dried at 120° C. for 15 hours, and then was baked at 500° C. for 2 hours. Thus, palladium/alumina catalyst powder was obtained, in which the amount ratio of the loaded palladium to alumina in a state where the adsorbed water is removed therefrom, is approximately 7.5 wt %.

The obtained palladium/alumina catalyst powder and boehmite powder were mixed in a mass ratio of 10:1 (palladium/alumina catalyst powder:boehmite powder), and were added with 1 wt % of nitric acidic alumina sol, and then were mixed with water. This was subjected to a milling treatment for 60 minutes in a magnetic ball mill pot containing alumina balls having a diameter of 7 mm, and thus slurry containing the catalyst powder was obtained.

The slurry was coated on a cordieritic monolithic honeycomb support (φ 35 mm:40 ml) for laboratory-scale testing, which has 400 cells of air vents per 1 square inch, was dried at 110° C. and baked at 400° C., and thus a monolithic honeycomb catalyst 1 was manufactured. The coating amount of the catalyst powder to the monolithic honeycomb support was set at 45 g/L.

CATALYST EXAMPLE 2

The concentration of the palladium nitrate aqueous solution was set at 0.13 time that of the example 1, and thus palladium/alumina catalyst powder was obtained, in which the amount ratio of the loaded palladium to alumina in a state where the adsorbed water is removed therefrom, is approximately 1 wt %. Similarly to the catalyst example 1 apart from the above, a monolithic honeycomb catalyst 2 was manufactured. The coating amount of the catalyst powder to the monolithic honeycomb support was set at 45 g/L.

CATALYST EXAMPLE 3

The concentration of the palladium nitrate aqueous solution was set at 0.33 time that of the example 1, and thus palladium/alumina catalyst powder was obtained, in which the amount ratio of the loaded palladium to alumina in a state where the adsorbed water is removed therefrom, is approximately 2.5 wt %. Similarly to the catalyst example 1 apart from the above, a monolithic honeycomb catalyst 3 was manufactured. The coating amount of the catalyst powder to the monolithic honeycomb support was set at 45 g/L.

CATALYST EXAMPLE 4

The concentration of the palladium nitrate aqueous solution was set at 1.34 time that of the example 1, and thus palladium/alumina catalyst powder was obtained, in which the amount ratio of the loaded palladium to alumina in a state where the adsorbed water is removed therefrom, is approximately 10 wt %. Similarly to the catalyst example 1 apart from the above, a monolithic honeycomb catalyst 4 was manufactured. The coating amount of the catalyst powder to the monolithic honeycomb support was set at 45 g/L.

CATALYST EXAMPLE 5

The concentration of the palladium nitrate aqueous solution was set at 1.54 time that of the example 1, and thus palladium/alumina catalyst powder was obtained, in which the amount ratio of the loaded palladium to alumina in a state where the adsorbed water is removed therefrom, is approximately 11.5 wt %. Similarly to the catalyst example 1 apart from the above, a monolithic honeycomb catalyst 5 was manufactured. The coating amount of the catalyst powder to the monolithic honeycomb support was set at 45 g/L.

CATALYST EXAMPLES 6 TO 9

The monolithic honeycomb catalysts 1 obtained in the catalyst example 1 were impregnated with barium nitrate aqueous solutions different from one another in concentration, and thus four types of monolithic honeycomb catalysts 6, 7, 8 and 9 were manufactured, in which amount ratios of loaded Ba to Pd/Al$_2$O$_3$ catalyst powder were 1 wt %, 3 wt %, 5 wt % and 8 wt %. The coating amount of the catalyst powder to the monolithic honeycomb support was set at 45 g/L.

CATALYST EXAMPLE 10

Active alumina (γ-alumina) having a specific surface area of 240 m$^2$/g was impregnated with a dinitrodiammineplatinum aqueous solution in which a concentration of platinum is approximately 1 wt %, and was dried at 120° C. for 15 hours, and then was baked at 500° C. for 2 hours. Thus, platinum/alumina catalyst powder was obtained, in which the amount ratio of the loaded platinum is 0.9 wt %. Thereafter, slurry was obtained similarly to the catalyst example 1, and a monolithic honeycomb catalyst 10 was manufactured similarly. The coating amount of the catalyst powder to the monolithic honeycomb support was set at 45 g/L.

CATALYST EXAMPLE 11

α-alumina powder having a specific surface area of approximately 8 m$^2$/g was added with 3 wt % of nitric acidic alumina sol, was mixed with water, and then was milled for 60 minutes in a magnetic ball mill pot containing alumina balls having a diameter of 7 mm. Thus, slurry of α-alumina was obtained. The slurry was coated on a cordieritic monolithic honeycomb support (φ 35 mm:40 ml) having 400 cells of air vents per 1 square inch, was dried at 110° C. and baked at 400° C., and thus a pre-coated honeycomb support was obtained. The coating amount of α-alumina to the monolithic honeycomb support was set at approximately 60 g/L.

Active alumina (γ-alumina) having a specific surface area of 240 m$^2$/g was impregnated with a dinitrodiammineplatinum aqueous solution in which a concentration of platinum is 2.2 wt %, and was dried at 120° C. for 15 hours, and then was baked at 500° C. for 2 hours. Thus, platinum/alumina catalyst powder was obtained, in which the amount ratio of the loaded platinum to alumina in a state where the adsorbed water is removed therefrom, is approximately 7.5 wt %.

The obtained platinum/alumina catalyst powder and boehmite powder were mixed in a mass ratio of 10:1 (platinum/alumina catalyst powder: boehmite powder), and were added with 1 wt % of nitric acidic alumina solution, and then were mixed with water. This was milled for 60 minutes in a magnetic ball mill pot containing alumina balls having a diameter of 7 mm, and thus slurry containing the catalyst powder was obtained.

The slurry was coated on the foregoing pre-coated honeycomb support, was dried at 110° C. and baked at 500° C., and thus a monolithic honeycomb catalyst 11 was manufactured. The coating amount of the catalyst powder to the pre-coated honeycomb support was set at approximately 70 g/L.

CATALYST EXAMPLE 12

A mixed solution of the dinitrodiammineplatinum aqueous solution and a rhodium nitrate aqueous solution was used in place of the dinitrodiammineplatinum aqueous solution. Similarly to the catalyst example 11 apart from the above, platinum/alumina catalyst powder was obtained, in which the amount ratio of the loaded platinum to alumina in a state where the adsorbed water is removed therefrom, is approximately 5 wt %, and the amount ratio of the loaded rhodium thereto is 0.5 wt %. Thereafter, a monolithic honeycomb catalyst 12 was manufactured similarly. The coating amount of the catalyst powder to the pre-coated honeycomb support was set at approximately 90 g/L.

CATALYST EXAMPLES 13 TO 17

Silica having a specific surface area of approximately 120 m$^2$/g, magnesia having a specific surface area of approximately 40 m$^2$/g, zirconia having a specific surface area of approximately 60 m$^2$/g, ceria having a specific surface area of approximately 30 m$^2$/g, and titania having a specific surface area of approximately 65 m$^2$/g were added to active alumina (γ-alumina), respectively, in which each amount ratio is approximately 10 wt % with respect to a mass of the alumina. Similarly to the catalyst example 11 apart from the above, five types of catalyst powder were obtained, in which the amount ratios of the loaded platinum to the respective carriers in a state where the adsorbed water is removed therefrom, are approximately 7.5 wt %. Thereafter, monolithic honeycomb catalysts 13 to 17 were manufactured similarly (in accordance with an order of enumerated numbers: Pt/silica-alumina catalyst; Pt/magnesia-alumina catalyst; Pt/zirconia-alumina catalyst; Pt/ceria-alumina catalyst; and Pt/titania-alumina catalyst). The coating amount of each of the catalyst powder to the monolithic honeycomb support was set at approximately 70 g/L.

CATALYST EXAMPLE 18

The platinum/alumina catalyst powder obtained in the catalyst example 11, in which the amount ratio of the loaded platinum to alumina in a state where the adsorbed water is removed therefrom is approximately 7.5 wt %, was added with MFI-type zeolite having a ratio of silica/alumina of approximately 32. The amount ratio of the MFI-type zeolite is approximately 40 wt % with respect to the catalyst powder. Similarly to the catalyst example 11 apart from the above, a monolithic honeycomb catalyst 18 was manufactured. The coating amount of the catalyst powder to the monolithic honeycomb support was set at 100 g/L.

CATALYST EXAMPLE 19

A palladium nitrate solution was used in place of the dinitrodiammineplatinum aqueous solution. Similarly to the catalyst example 11 apart from the above, slurry containing catalyst powder in which the amount ratio of the loaded palladium to alumina in a state where the adsorbed water is removed therefrom is approximately 5 wt % was prepared.

This slurry was coated on a half of the pre-coated honeycomb support. Subsequently, the slurry containing the platinum/alumina catalyst powder prepared in the catalyst example 11, in which the amount ratio of the loaded platinum to alumina in a state where the adsorbed water is removed therefrom is approximately 7.5%, was coated on a remaining half of the support. Thereafter, a monolithic honeycomb catalyst 19 was manufactured similarly to the example 11. The coating amount of the catalyst powder to the monolithic honeycomb support was set at 80 g/L.

CATALYST EXAMPLE 20

The concentration of the dinitrodiammineplatinum aqueous solution was changed, and thus platinum/alumina catalyst powder was obtained, in which the amount ratio of the loaded platinum to alumina in a state where the adsorbed water is removed therefrom, is approximately 1 wt %. Similarly to the catalyst example 11 apart from the above, a monolithic honeycomb catalyst 20 was manufactured. The coating amount of the catalyst powder to the monolithic honeycomb support was set at 200 g/L.

CATALYST EXAMPLE 21

The concentration of the dinitrodiammineplatinum aqueous solution was changed, and thus platinum/alumina catalyst powder was obtained, in which the amount ratio of the loaded platinum to alumina in a state where the adsorbed water is removed therefrom, is approximately 10 wt %. Similarly to the catalyst example 11 apart from the above, a monolithic honeycomb catalyst 21 was manufactured. The coating amount of the catalyst powder to the monolithic honeycomb support was set at 50 g/L.

CATALYST EXAMPLE 22

The concentration of the dinitrodiammineplatinum aqueous solution was changed, and thus platinum/alumina catalyst powder was obtained, in which the amount ratio of the loaded platinum to alumina in a state where the adsorbed water is removed therefrom, is approximately 0.1 wt %. Similarly to the catalyst example 11 apart from the above, a monolithic honeycomb catalyst 22 was manufactured. The coating amount of the catalyst powder to the monolithic honeycomb support was set at 250 g/L.

CATALYST EXAMPLE 23

The concentration of the dinitrodiammineplatinum aqueous solution was changed, and thus platinum/alumina catalyst powder was obtained, in which the amount ratio of the loaded platinum to alumina in a state where the adsorbed water is removed therefrom, is approximately 0.5 wt %. Similarly to the catalyst example 11 apart from the above, a monolithic honeycomb catalyst 23 was manufactured. The coating amount of the catalyst powder to the monolithic honeycomb support was set at 150 g/L.

CATALYST EXAMPLE 24

The concentration of the dinitrodiammineplatinum aqueous solution was changed, and thus platinum/alumina catalyst powder was obtained, in which the amount ratio of the loaded platinum to alumina in a state where the adsorbed water is removed therefrom, is approximately 3 wt %. Similarly to the catalyst example 11 apart from the above, a monolithic honeycomb catalyst 24 was manufactured. The coating amount of the catalyst powder to the monolithic honeycomb support was set at 30 g/L.

The catalyst specifications of the monolithic honeycomb catalysts 1 to 24 are shown in Table 1 in summary. Moreover, items evaluated just for reference are shown in Table 1, including methane removal rates measured in conformity with the following "2. Testing device and measurement condition".

TABLE 1

| | Catalytic ingredient | Carrier | Loaded amount of catalytic ingredient to carrier (wt %) | Methane removal rate (%) | Remarks |
|---|---|---|---|---|---|
| Catalyst example 1 | Pd | alumina | 7.5 | — | |
| Catalyst example 2 | Pd | alumina | 1 | — | |
| Catalyst example 3 | Pd | alumina | 2.5 | — | |
| Catalyst example 4 | Pd | alumina | 10 | — | |
| Catalyst example 5 | Pd | alumina | 11.5 | — | |
| Catalyst example 6 | Pd | alumina | 7.5 | — | containing 1 wt % of Ba |
| Catalyst example 7 | Pd | alumina | 7.5 | — | containing 3 wt % of Ba |
| Catalyst example 8 | Pd | alumina | 7.5 | — | containing 5 wt % of Ba |
| Catalyst example 9 | Pd | alumina | 7.5 | — | containing 8 wt % of Ba |
| Catalyst example 10 | Pt | alumina | 0.9 | — | |
| Catalyst example 11 | Pt | alumina | 7.5 | 88 | |
| Catalyst example 12 | Pt—Rh alloy | alumina | 5 (Pt) 0.5 (Rh) | 85 | |
| Catalyst example 13 | Pt | alumina + silica | 7.5 | 84 | |
| Catalyst example 14 | Pt | alumina + magnesia | 7.5 | 86 | |
| Catalyst example 15 | Pt | alumina + zirconia | 7.5 | 88 | |
| Catalyst example 16 | Pt | alumina + ceria | 7.5 | 87 | |
| Catalyst example 17 | Pt | alumina + titania | 7.5 | 84 | |
| Catalyst example 18 | Pt | alumina | 7.5 | 89 | containing zeolite |
| Catalyst example 19 | Pd Pt | alumina | 5 (Pd) 7.5 (Pt) | 90 | |
| Catalyst example 20 | Pt | alumina | 1 | 48 | |
| Catalyst example 21 | Pt | alumina | 10 | 67 | |
| Catalyst example 22 | Pt | alumina | 0.1 | — | |
| Catalyst example 23 | Pt | alumina | 0.5 | — | |
| Catalyst example 24 | Pt | alumina | 3 | — | |

<2. Testing Device and Measurement Condition>

In evaluating the catalytic performance, a flow-type fixed bed reactor was used. Gas simulating the exhaust gas from the fuel cell stack was flown through the monolithic honeycomb catalyst, and the $CH_4$ removal rate was evaluated. The components of the simulation gas were set as: 22 vol % for $CO_2$; 33 volt % for $H_2O$; 0.7 vol % for $CH_4$; 2.0 vol % for $H_2$; a variable amount for $O_2$; and a residual for $N_2$. The amount of gas flow was set at 50 L/min. The size of the monolithic honeycomb catalyst was set at 40 ml, unless particularly specified. A space velocity in this case became approximately 43,000 $h^{-1}$.

$CH_4$ in the inlet gas of the monolithic honeycomb catalyst and $CH_4$ in the outlet gas thereof were analyzed by a gas chromatography, and thus the $CH_4$ removal rate of each catalyst example was calculated by the following formula (6):

$$CH_4 \text{ removal rate } (\%) = \frac{\text{Concentration of inlet gas} - \text{Concentration of outlet gas}}{\text{Concentration of inlet gas}} \times 100 \quad (6)$$

The $H_2$ removal rate was calculated similarly. In changing a temperature of catalyst layer, an electric furnace was used. Moreover, the concentrations of oxygen, methane and hydrogen were measured by means of the gas chromatography, and thus the oxygen excessive rate was calculated in accordance with the foregoing formula (6).

<3-1. Relationship Investigation Between Catalyst Inlet temperature and $CH_4$ Removal Rate>

Figure 1:
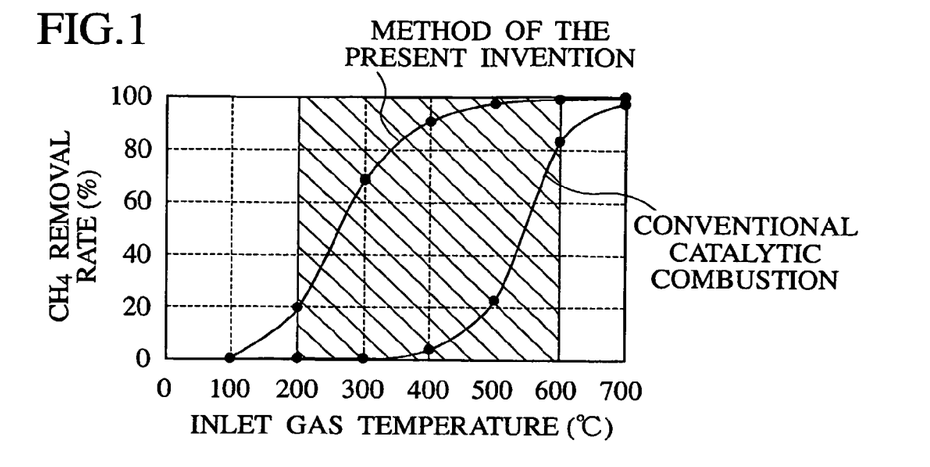
FIG. 1 is a graph showing a relationship between a methane removal rate and a temperature of gas supplied to a region on which a methane removal catalyst is disposed.

A relationship between the gas temperature at the catalyst inlet and the $CH_4$ removal rate was investigated by use of the monolithic honeycomb catalyst 1. FIG. 1 shows a result thereof. The monolithic honeycomb catalyst 1 exhibited the $CH_4$ removal rates of 50% at 250° C., 70% at 300° C. and 95% at 400° C.

A relationship between the gas temperature at the catalyst inlet and the $CH_4$ removal rate in the case of removing methane by the catalytic combustion method was investigated on the assumption that the oxygen excessive rate was set at 300%. FIG. 1 shows a result thereof. It was confirmed that methane could hardly be removed not only at 400° C. but also at 500° C.

As shown in FIG. 1, it was confirmed that a high $CH_4$ removal rate could be realized even at the low temperature range if the monolithic honeycomb catalyst according to the present invention was used.

<3-2. Relationship Investigation between Amount Ratio of Loaded Platinum and $CH_4$ Removal Rate>

Figure 2:
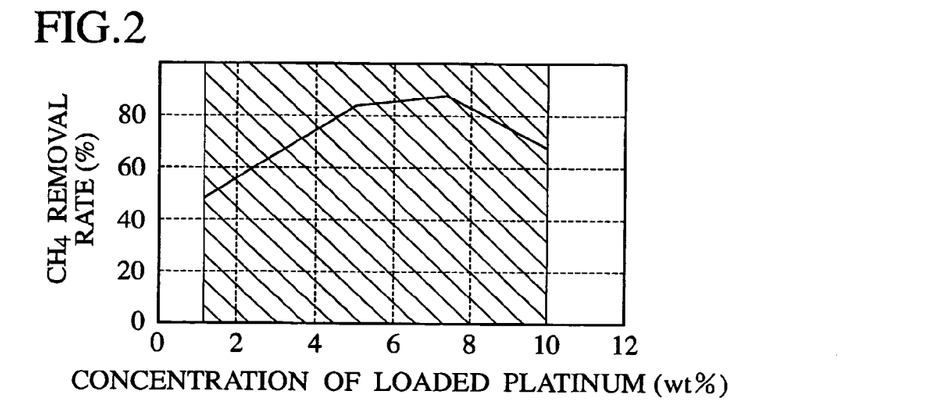
FIG. 2 is a graph showing a relationship between the methane removal rate and a concentration of loaded platinum of the methane removal catalyst.

The $CH_4$ removal rates of the monolithic honeycomb catalysts 11, 12, 20 and 21 were investigated individually. The gas temperature at the inlet of each of the monolithic honeycomb catalysts was set at 320° C. FIG. 2 shows a graph in which an axis of abscissas represents the concentrations of loaded platinum, an axis of ordinate represents the $CH_4$ removal rates, and the obtained values are plotted thereon. It was indicated that an excellent $CH_4$ removal rate was manifested particularly in the case where the concentration of the loaded platinum to alumina in a state where the adsorbed water was removed therefrom is in a range from 1 wt % to 10 wt %.

<3-3. Relationship Investigation between Alkaline Earth Metal in Catalyst and $CH_4$ Removal Rate>

Figure 3:
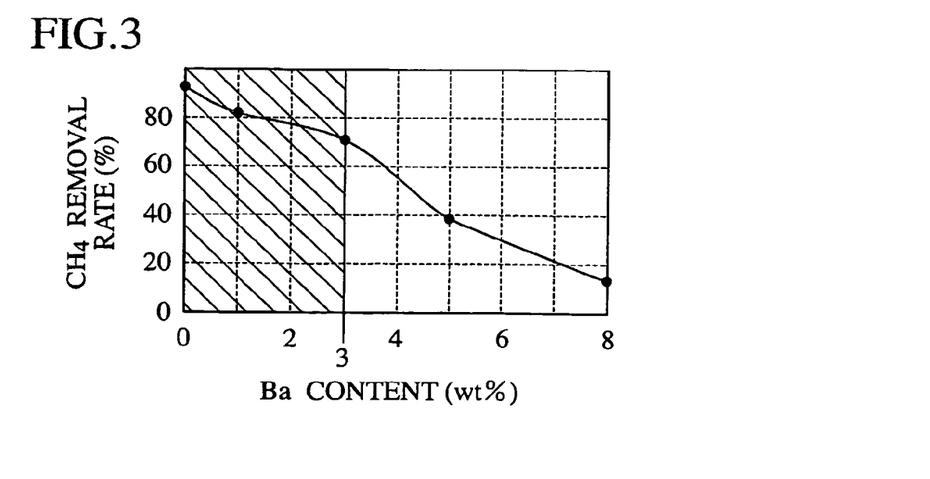
FIG. 3 is a graph showing a relationship between the methane removal rate and a content of barium of the methane removal catalyst.

The $CH_4$ removal rates of the monolithic honeycomb catalysts 1 and 6 to 9 were investigated individually. The composition of the simulation gas flowing through each of the monolithic honeycomb catalysts was set as: 22 vol % for $CO_2$; 33 vol % for $H_2O$; 0.7 vol % for $CH_4$; 2.0 vol % for $H_2$; 1.7 vol % for $O_2$; and a residual for $N_2$. Accordingly, the oxygen excessive rate was 70%. The gas temperature at the inlet of each of the monolithic honeycomb catalysts was set at 320° C. FIG. 3 shows a graph in which an axis of abscissas represents the contents of barium, an axis of ordinate represents the $CH_4$ removal rates, and the obtained values are plotted thereon. It was indicated that an excellent $CH_4$ removal rate was obtained in the case where the amount of barium as alkaline earth metal was small, particularly where the content of barium as alkaline earth metal was 3 wt % or less.

<3-4. Performance Evaluation Test for Two-stage Exhaust Gas Purifying System>

EXAMPLE 1

Investigation was made for the $CH_4$ removal rate and the $H_2$ removal rate of the two-stage exhaust gas purifying system (refer to FIG. 4A) formed by combining the monolithic honeycomb catalyst 1 (used as a methane removal catalyst) and the monolithic honeycomb catalyst 2 (used as a hydrogen and carbon monoxide removal catalyst). The composition of the simulation gas flowing through the exhaust gas purifying system was set as: 25 vol % for $CO_2$; 35 vol % for $H_2O$; 0.5 vol % for $CH_4$; 1.2 vol % for $H_2$; 1.35 vol % for $O_2$; and a residual for $N_2$. Accordingly, the oxygen excessive rate of the simulation gas at the inlet of the monolithic honeycomb catalyst 1 was 84%. Each of the gas temperatures at the inlets of the monolithic honeycomb catalysts 1 and 2 was set at 350° C. The amount of gas flow was set at 50 L/min. The size of each catalyst was adjusted by cutting. The size of the monolithic honeycomb catalyst 1 was set at 35 ml, and the size of the monolithic honeycomb catalyst 2 was set at 30 ml. The space velocity was set at 46,000 $h^{-1}$. The oxygen excessive rate at the inlet of the monolithic honeycomb catalyst 2 was adjusted at 300% by supplying oxygen gas thereto. The concentration of $CH_4$ in the simulation gas that passed through this exhaust gas purifying system was reduced to 0.05 vol %, and the concentration of $H_2$ therein was reduced to 0.1 vol %.

EXAMPLE 2

The monolithic honeycomb catalyst 10 was used in place of the monolithic honeycomb catalyst 2. Similarly to the example 1 other than the above, the $CH_4$ removal rate and the $H_2$ removal rate of the two-stage exhaust gas purifying system (refer to FIG. 4B) were investigated. The concentration of $CH_4$ in the simulation gas that passed through this exhaust gas purifying system was 0.06 vol %, and $H_2$ was not detected therein.

EXAMPLE 3

Figure 4C:
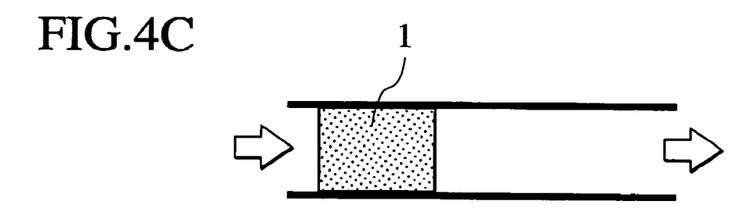
FIG. 4C is a schematic view of a one-stage exhaust gas purifying system.
Figure 5:
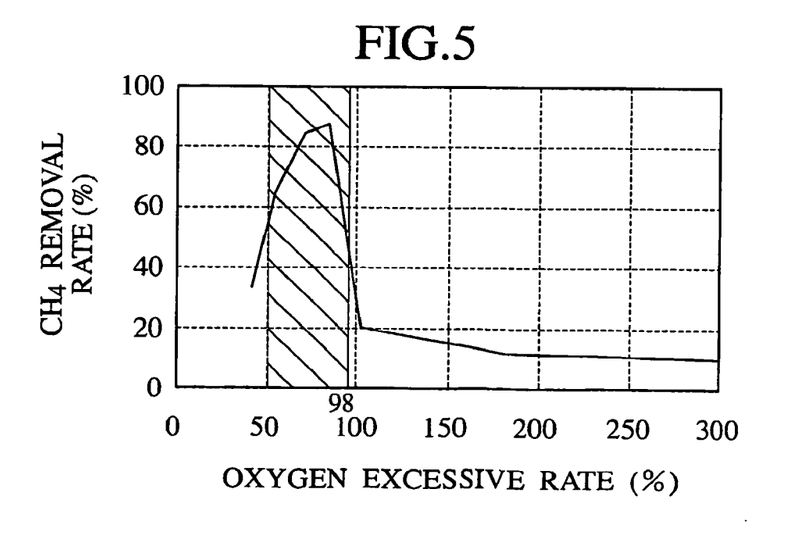
FIG. 5 is a graph showing a relationship between the methane removal rate and an oxygen excessive rate of the exhaust gas supplied to the methane removal catalyst.

The exhaust gas purifying system (refer to FIG. 4C) equipped only with the monolithic honeycomb catalyst 1 was prepared in place of the two-stage exhaust gas purifying system, and the $CH_4$ and $H_2$ removal rates thereof were investigated. The composition of the simulation gas flowing through the exhaust gas purifying system, the gas temperature at the inlet of the monolithic honeycomb catalyst 1 and the amount of the gas flow were set as the same as those of the example 1. Moreover, the size of the catalyst was set at 35 ml. The concentration of $CH_4$ in the simulation gas that passed through this exhaust gas purifying system was reduced to 0.075 vol %, and the concentration of $H_2$ therein was reduced to 0.4 vol %.

As shown in the examples 1 to 3, it was indicated that by adopting the two-stage structure for the exhaust gas purifying system and by adjusting the oxygen excessive rate, the amount of residual hydrogen in the gas emitted from the exhaust gas purifying system can be reduced in addition to that the methane removal can be accelerated.

<3-5. Relationship Investigation Between Oxygen Excessive Rate and $CH_4$ Removal Rate>

A relationship between the oxygen excessive rate and the $CH_4$ removal rate was investigated by use of the monolithic honeycomb catalyst 11. Table 5 shows a result thereof. It was made obvious that a high $CH_4$ removal rate was obtained in the case where the oxygen excessive rate was in a range from 50% to 98%.

<3-6. Relationship Investigation Among Oxygen Excessive Rate, Residual $H_2$ and Residual CO in the Two-stage Exhaust Gas Purifying System>

Figure 6:
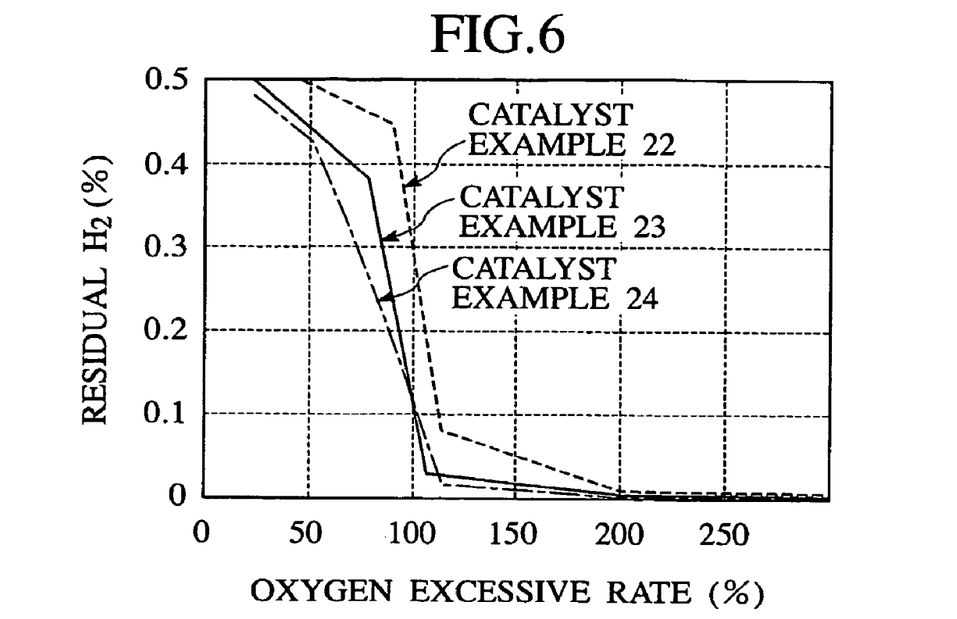
FIG. 6 is a graph showing a relationship between a content of residual hydrogen and the oxygen excessive rate of the gas supplied to the catalyst provided downstream in the two-stage exhaust gas purifying system.
Figure 7:
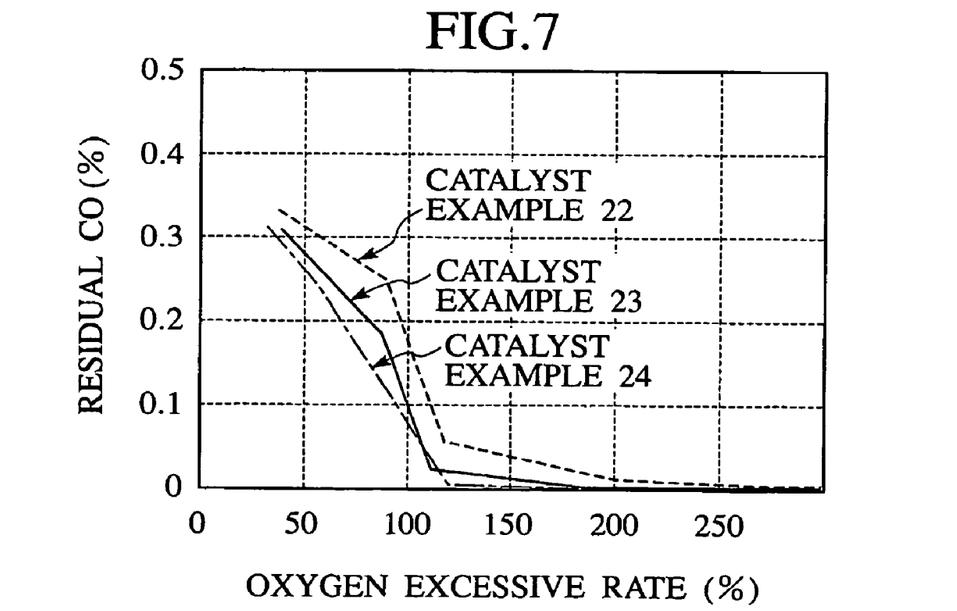
FIG. 7 is a graph showing a relationship between a content of residual carbon dioxide and the oxygen excessive rate of the gas supplied to the catalyst provided downstream in the two-stage exhaust gas purifying system.
Figure 8:
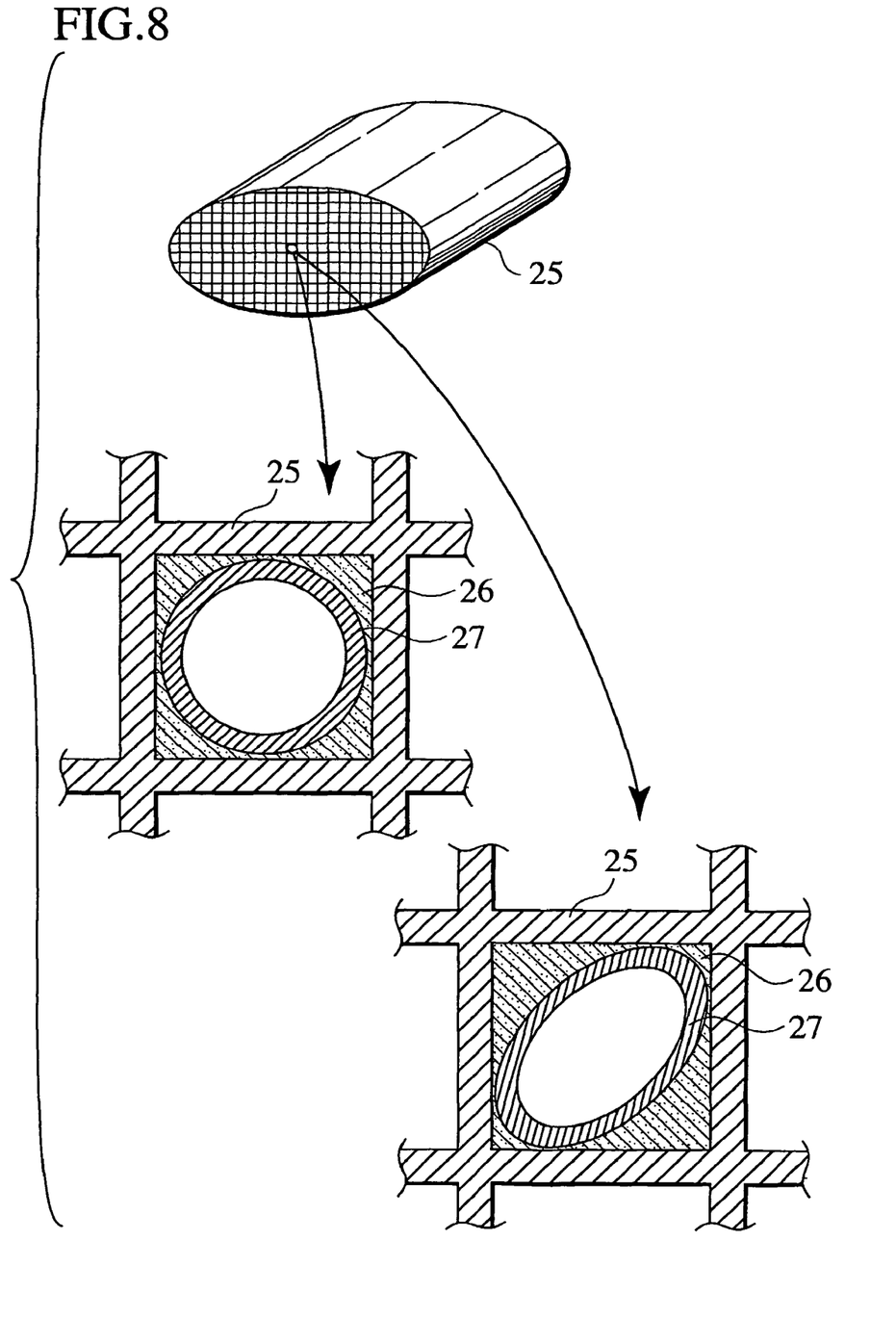
FIG. 8 is a perspective view showing a configuration of a monolithic honeycomb catalyst of the present invention, and a partial sectional view showing a part of the catalyst.

The oxygen excessive rates at the inlets of the monolithic honeycomb catalysts 22 to 24 were changed in two-stage exhaust gas purifying systems formed by combining the monolithic honeycomb catalyst 11 and the monolithic honeycomb catalysts 22 to 24. Then, the changes of residual $H_2$ and residual CO at the outlets of the monolithic honeycomb catalysts 22 to 24 were investigated. FIGS. 6 and 7 show results thereof. It was confirmed that $H_2$ and CO could be removed effectively in the case where the oxygen excessive rate was 100% or more.

The entire content of a Japanese Patent Application No. P2001-397216 with a filing date of Dec. 27, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

As described above, according to the embodiments of the present invention, it is possible to remove methane extremely efficiently even in a low temperature range, for example, at 400° C. or less since methane contained in the exhaust gas of the fuel cell stack is activated by the methane removal catalyst. Accordingly, in comparison with the conventional exhaust gas purifying system in which the high temperature of methane removal catalyst must be obtained, system simplification is possible, and the manufacturing cost of the exhaust gas purifying system can be lowered. Moreover, the weight of the exhaust gas purifying system can be reduced, and the fuel consumption of the fuel cell vehicle on which the exhaust gas purifying system of the present invention is mounted can be improved.

Moreover, palladium excellent in low-temperature oxidation activity is used as the methane removal catalyst, thus making it possible to remove methane efficiently.

Moreover, alumina, silica, magnesia, zirconia, ceria or titania is used as the carrier, thus making it possible to effectively load the catalytic ingredient dispersedly thereon. Moreover, as a catalytic ingredient, ceria is also conceived to have a function of alleviating the poisoning effect caused by $O_2$, since ceria has O2 adsorption/emission function.

Moreover, the content of the catalytic ingredient contained in the methane removal catalyst is set relatively high so as to be in a range from 1 wt % to 10 wt % with respect to the mass of the carrier from which the adsorbed water is removed. Thus, hydrogen coexisting in the exhaust gas can be burned quickly. The removal reaction for methane by the methane removal catalyst can be progressed efficiently since the catalytic ingredient can be heated up by utilizing combustion heat generated at this stage.

Moreover, zeolite is made to contain in the methane removal catalyst, thus making it possible to adsorb steam in the exhaust gas by zeolite. Therefore, the adverse effect by the steam to the catalytic ingredient can be alleviated, and the removal reaction for methane can be accelerated.

Moreover, the content of each of the alkaline metal and the alkaline earth metal in the foregoing methane removal catalyst is set at 3 wt % or less with respect to the methane removal catalyst, and thus the catalytic performance can be prevented from being lowered.

Furthermore, the methane removal catalyst is arranged on the upstream and the hydrogen and carbon monoxide removal catalyst are further arranged on the downstream with regard to the exhaust gas of the fuel cell stack. Thus, the methane removal catalyst can mainly take charge of converting methane into hydrogen and carbon monoxide, and the hydrogen and carbon monoxide removal catalyst can mainly take charge of converting hydrogen and carbon monoxide into water and carbon dioxide. In such a manner, high methane removal efficiency can be attained, and further, the amount of residual hydrogen in the gas that flowed through the exhaust gas purifying system of the present invention can be reduced to an extremely low concentration.

Moreover, platinum excellent in complete oxidation activity is used as the hydrogen and carbon monoxide removal catalyst, and thus hydrogen and carbon monoxide can be removed efficiently and the amount of residual hydrogen can be lowered to an extremely low concentration.

Furthermore, the content of the catalytic ingredient contained in the hydrogen and carbon monoxide removal catalyst is set in a range from 0.1 wt % to 3 wt % with respect to the mass of the carrier from which the adsorbed water is removed, thus making it possible to reduce the concentrations of residual methane and residual hydrogen of the entire catalyst system.

Moreover, the abrasion of the catalyst can be reduced and the catalyst can be prevented from being emitted together with the exhaust gas since the methane removal catalyst and the hydrogen and carbon monoxide removal catalyst are monolithic honeycomb catalysts. In addition, pressure loss can be lowered, and the exhaust gas purifying system can be minimized, by utilizing the catalytic ingredients effectively.

Furthermore, the shape of the openings of each monolithic honeycomb catalyst is circular or elliptical, and therefore, the catalytic ingredient supported thereon can be fully utilized, and the effectiveness of the catalytic ingredient is improved.

Moreover, the amount of the refractory inorganic compound supported on the monolithic honeycomb catalyst is in a range from 50 g/L to 100 g/L, and therefore, the shape of the openings of the monolithic honeycomb catalyst is formed to be circular or elliptical in order to maximize the utilization of catalytic ingredient.

Furthermore, it is possible to remove methane extremely efficiently since the methane removal catalyst activates methane contained in the exhaust gas of the fuel cell stack. In addition, the oxygen excessive rate of the exhaust gas at the inlet of the region where the methane removal catalyst is provided is controlled in a range from 50% to 98%, and thus the methane removal efficiency by the methane removal catalyst can be set extremely high even in a low-temperature range, for example, at 400° C. or less.

Moreover, according to the embodiments regarding the exhaust gas purifying method of the fuel cell vehicle of the present invention, the hydrogen and carbon monoxide removal catalyst is further arranged on the downstream with regard to the exhaust gas from the fuel cell stack, and therefore, methane can be removed at high efficiency. In addition, the amount of residual hydrogen can be reduced to an extremely low concentration. Further, the oxygen excessive rate at the inlet of the region where the catalyst that converts hydrogen into water is provided is controlled to be 100% or more. Thus, the amounts of hydrogen and carbon monoxide, which remain in the gas that passed through the exhaust gas purifying system, can be reduced to an extremely low concentration.

Furthermore, the temperature. of the exhaust gas of the fuel cell stack, which is introduced to the region where the methane removal catalyst is provided, is controlled in a range from 200° C. to 600° C., and thus the removal of methane contained in the exhaust gas of the fuel cell stack can be accelerated. In addition, when the temperature of the methane removal catalyst is 600° C. or less, a heat exchanger for heating up the methane removal catalyst can be applied even if heat resistance thereof is low. For example, the constituent members of the heat exchanger can be selected from various materials in comparison with the case where the heat resistance no less than 800° C. is required, leading to an advantage in terms of the manufacturing cost.

The invention claimed is:

1. An exhaust gas purifying method for a fuel cell vehicle, comprising:

providing an exhaust gas purifying system for the fuel cell vehicle, the exhaust gas purifying system including a methane removal catalyst for accelerating oxidation of methane into hydrogen and carbon monoxide by an oxidizing agent comprising oxygen, the methane removal catalyst, comprising:

a first catalytic ingredient including at least one of rhodium, platinum and palladium, wherein an oxygen excessive rate $\zeta$ of exhaust gas introduced to a region where the methane removal catalyst is disposed is set in a range from 50% to 98%, the oxygen excessive rate $\zeta$ being defined by a following formula (1):

$$\zeta = \frac{C_{O2}}{C_{CH4} \times 2 + C_{H2} \times 0.5} \times 100 \qquad (1)$$

where $C_{O2}$ is a concentration of oxygen, $C_{CH4}$ is a concentration of methane, and $C_{H2}$ is a concentration of hydrogen and wherein a temperature of the exhaust gas introduced to the methane removal catalyst is controlled in a range from 200° C. to 600° C.

2. An exhaust gas purifying method for a fuel cell vehicle, comprising:

providing an exhaust gas purifying system for the fuel cell vehicle, the exhaust gas purifying system including a methane removal catalyst for accelerating oxidation of methane into hydrogen and carbon monoxide by an oxidizing agent comprising oxygen, the methane removal catalyst, comprising:

a first catalytic ingredient including at least one of rhodium, platinum and palladium, wherein an oxygen excessive rate $\zeta$ of exhaust gas introduced to a region where the methane removal catalyst is disposed is set in a range from 50% to 98%, the oxygen excessive rate $\zeta$ being defined by a following formula (1):

$$\zeta = \frac{C_{O2}}{C_{CH4} \times 2 + C_{H2} \times 0.5} \times 100 \qquad (1)$$

where $C_{O2}$ is a concentration of oxygen, $C_{CH4}$ is a concentration of methane, and $C_{H2}$ is a concentration of hydrogen; and wherein the method further comprises:

providing a hydrogen and carbon monoxide removal catalyst for accelerating conversion of hydrogen and carbon monoxide into water and carbon dioxide, the hydrogen and carbon monoxide removal catalyst being disposed downstream of the methane removal catalyst with regard to flow of the exhaust gas of a fuel cell stack, the hydrogen and carbon monoxide removal catalyst, comprising:

a second catalytic ingredient including at least one of rhodium, platinum and palladium, wherein an oxygen excessive rate of exhaust gas introduced to a region where the hydrogen and carbon monoxide removal catalyst is disposed is 100% or more, the oxygen excessive rate being represented by the formula (1).

* * * * *